(12) United States Patent
Grace et al.

(10) Patent No.: US 12,086,962 B2
(45) Date of Patent: Sep. 10, 2024

(54) ADAPTIVE ADJUSTMENTS TO VISUAL MEDIA TO REDUCE MOTION SICKNESS

(71) Applicant: GM Cruise Holdings LLC, San Francisco, CA (US)

(72) Inventors: Nestor Grace, San Francisco, CA (US); Diego Plascencia-Vega, San Francisco, CA (US); Dogan Gidon, Berkeley, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/330,838

(22) Filed: Jun. 7, 2023

(65) Prior Publication Data

US 2023/0316466 A1 Oct. 5, 2023

Related U.S. Application Data

(63) Continuation of application No. 16/928,604, filed on Jul. 14, 2020, now Pat. No. 11,710,216.

(51) Int. Cl.
| | |
|---|---|
| *G06T 5/70* | (2024.01) |
| *B60K 35/00* | (2024.01) |
| *B60K 35/10* | (2024.01) |
| *B60K 35/22* | (2024.01) |
| *B60K 35/53* | (2024.01) |
| *G06F 3/01* | (2006.01) |
| *G06T 5/20* | (2006.01) |
| *G06T 7/20* | (2017.01) |

(52) U.S. Cl.
CPC ............... *G06T 5/70* (2024.01); *B60K 35/00* (2013.01); *G06F 3/013* (2013.01); *G06T 5/20* (2013.01); *G06T 7/20* (2013.01); *B60K 35/10* (2024.01); *B60K 35/22* (2024.01); *B60K 35/53* (2024.01); *B60K 2360/149* (2024.01); *B60K 2360/21* (2024.01); *G06T 2207/30252* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 8,708,884 | B1* | 4/2014 | Smyth | A61M 21/00 706/15 |
| 2002/0099257 | A1* | 7/2002 | Parker | A61M 21/00 600/27 |
| 2004/0100419 | A1* | 5/2004 | Kato | G09G 5/00 345/7 |
| 2014/0268356 | A1 | 9/2014 | Bolas et al. | |
| 2017/0136842 | A1* | 5/2017 | Anderson | B60G 99/002 |
| 2017/0352129 | A1* | 12/2017 | Fu | G09G 3/20 |
| 2018/0184014 | A1* | 6/2018 | Goldstein | G06V 20/56 |

(Continued)

*Primary Examiner* — Jason A Pringle-Parker

(57) ABSTRACT

The subject disclosure relates to solutions for reducing or eliminating motion sickness experienced by a vehicle occupant/passenger. In some aspects, a process of the disclosed technology includes steps for collecting motion data associated with a vehicle using one or more environmental sensors, tracking eye movements of a user within a cabin of the vehicle, processing the motion data and the eye movements to identify a motion event, and generating a motion compensation signal based on the motion event. Systems and machine-readable media are also provided.

20 Claims, 8 Drawing Sheets

(56) References Cited

U.S. PATENT DOCUMENTS

| | | | | |
|---|---|---|---|---|
| 2018/0366090 A1* | 12/2018 | Shatzki | .................... | G09G 5/37 |
| 2019/0022347 A1* | 1/2019 | Wan | ........................ | A61B 5/18 |
| 2019/0047498 A1* | 2/2019 | Alcaidinho | ........ | B60H 1/00742 |
| 2020/0062240 A1* | 2/2020 | Marzorati | ............ | B60N 2/0244 |
| 2020/0238876 A1* | 7/2020 | Dhaens | ................... | B60R 11/04 |
| 2020/0324675 A1* | 10/2020 | Yamamoto | ............... | B60N 2/90 |
| 2021/0146803 A1* | 5/2021 | Wu | ..................... | B60W 60/001 |
| 2022/0001893 A1* | 1/2022 | Tartz | ..................... | G16H 40/67 |

* cited by examiner

ADAPTIVE ADJUSTMENTS TO VISUAL MEDIA TO REDUCE MOTION SICKNESS

CROSS-REFERENCE TO RELATED APPLICATIONS

This application is a continuation of U.S. application Ser. No. 16/928,604, filed on Jul. 14, 2020, which is hereby incorporated by reference in its entirety.

BACKGROUND

1. Technical Field

The subject technology provides solutions for reducing motion sickness of a vehicle occupant and in particular, for adaptively adjusting visual media based on detected motion events in order to reduce occupant motion sickness.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
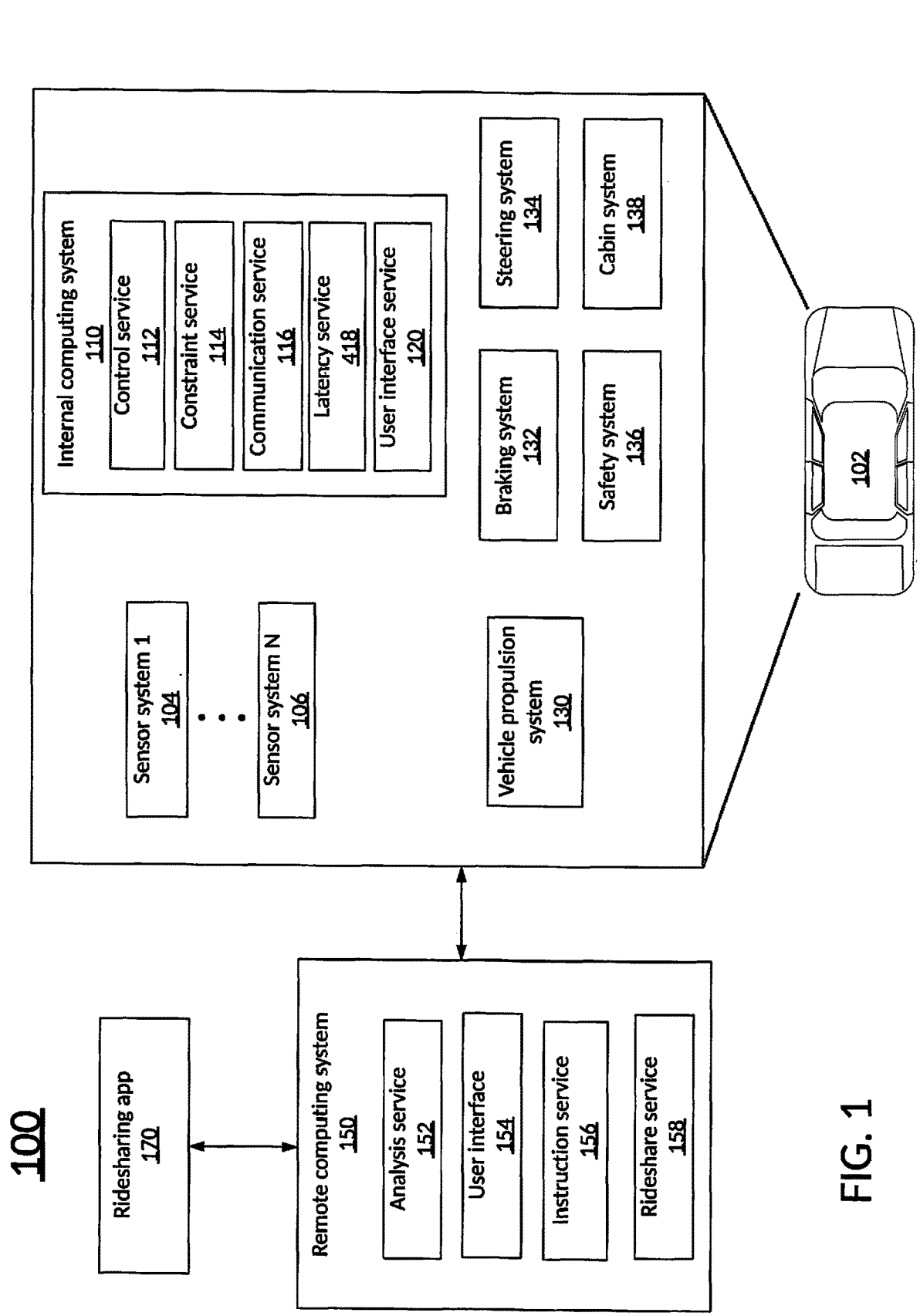
FIG. 1 illustrates an example system environment that can be used to facilitate AV navigation and routing operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Motion sickness is a commonly experienced symptom of vehicle passengers that typically occurs when passenger's (occupant's) perceived motion does not correspond with the actual vehicle motion. Motion sickness can be triggered by certain motion events, and exacerbated in instances where the occupants are looking at an object within the vehicle cabin, such as when reading a book, or looking at a display screen.

Aspects of the disclosed technology provide solutions for mitigating or eliminating motion sickness felt by the vehicle passengers by making dynamic changes to cabin parameters based on the detection of motion events that are likely to cause motion sickness. In some aspects, motion events are identified based on motion data collected for the vehicle. Based on the motion data, motion compensation signals can be generated that are used to make modifications necessary to attenuate the felt-experience of motion sickness by the vehicle users/occupants. In some aspects, the motion compensation signal/s can be configured to move or adjust the position of a display screen that is being viewed by one or more occupants. In other aspects, the motion compensation signal/s can be configured to adjust graphics displayed on one or more display screens, for example, by creating a blur filter in peripheral regions of an occupant's gaze. Additionally, in some aspects, the motion compensation signals may be used to prime or prepare the user for an upcoming/impending motion event. For example, the motion compensation signal may be used to provide haptic output to one or more vehicle seats that are occupied by one or more vehicle users/occupants.

Although several of the examples discussed herein relate to implementations in the context of an autonomous vehicle (AV) setup, it is understood that the disclosed technology is not limited to AV deployments. Similar techniques may be used in other contexts, such as, in non-autonomous vehicles, or in transportation systems of other types, e.g., trains, aircraft, watercraft, etc., without departing from the scope of the disclosed technology.

The disclosure now turns to FIG. 1, which illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 114 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc. Remote computing system 150 can, in some cases, include at least one computing system 150 as illustrated in or discussed with respect to FIG. 5, or may include at least a subset of the components illustrated in FIG. 5 or discussed with respect to computing system 150.

Figure 2A:
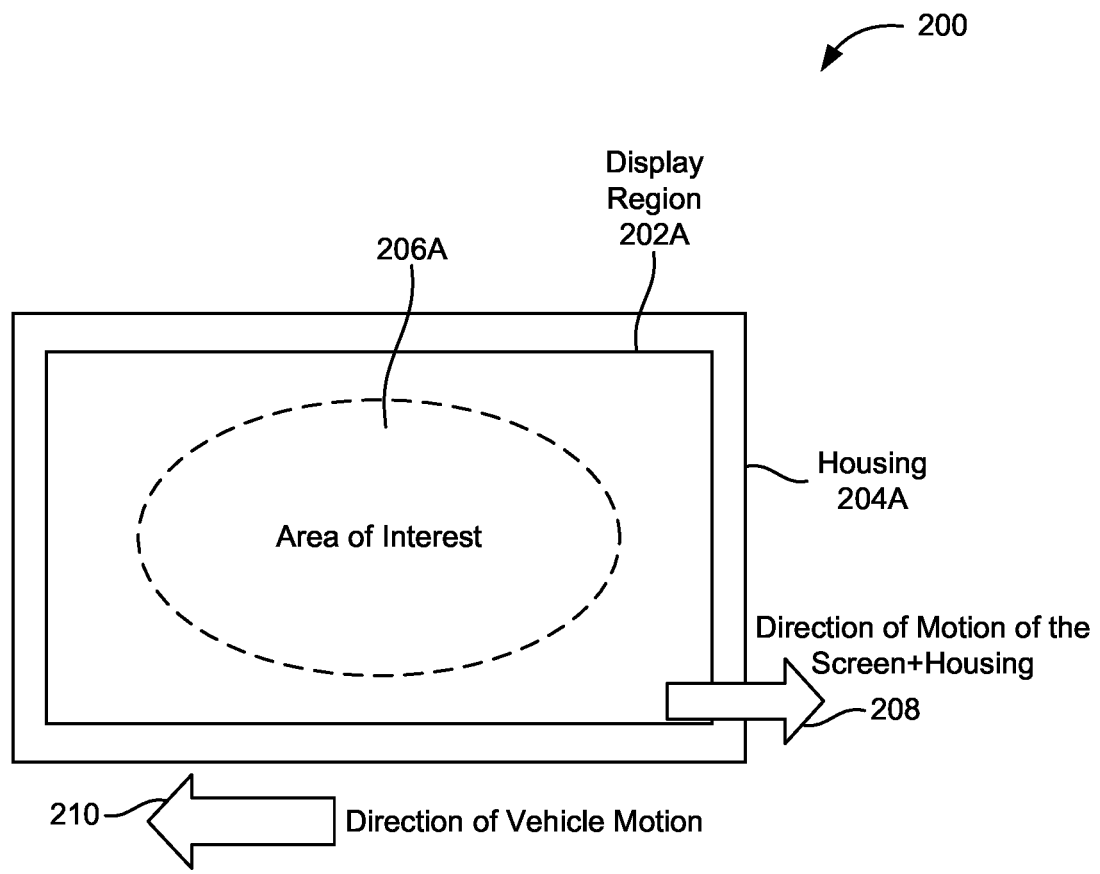
FIG. 2A illustrates an example display and housing that can be configured reduce occupant motion sickness, according to aspects of the disclosed technology.

FIG. 2A illustrates an example display 200 that can be configured reduce vehicle occupant motion sickness, according to aspects of the disclosed technology. Depending on the desired implementation, display 200 can represent a display that is affixed to an interior surface of a vehicle cabin, such as an in-dash, or in-seat computer display that is provided in the cabin of an autonomous vehicle (AV).

Display 200 includes a display region 202A that is enclosed by housing 204A. Display region 202A can be configured to display images/graphics, for example, as part of an infotainment system, navigation system, or AV monitoring system, or the like. Housing 204A can be coupled to one or more AV structures (not illustrated) such as a vehicle seat, headrest, or dashboard, etc. In practice, housing 204A can be coupled to one or more actuators or motors that can be configured to shift a position of display in response to a received motion compensation signal. For example, detected changes in vehicle (AV) motion that are identified by collected motion data can be used to generate a motion compensation signal that causes changes the positioning of display 200 that can be used to mitigate a feeling of motion sickness by the occupant.

In some aspects, as discussed in further detail below, the motion compensation signal can be further based on a detected direction of a gaze of one or more of the vehicle's occupants. For example, an occupant looking at a particular portion of display region 202A, such as at an area of interest 206A, may be susceptible to experiencing motion sickness under certain vehicle movement conditions represented by vehicle motion vector 210. To attenuate the severity of experienced motion sickness, a position of display 200 can be automatically adjusted in a direction indicated by a screen adjustment vector 208.

In some aspects, adjustment of a position of display 200 can be performed concurrently with the motion event. In other aspects, a position of display 200 may be adjusted in advance of an impending motion event. As discussed in further detail below, motion events may be identified by processing collected environmental data, for example, that provides measurements of vehicle position an or orientation collected by one or In some implementations, the reactive image adjustment can be based on a direction of the user's gaze (312).

Figure 2B:
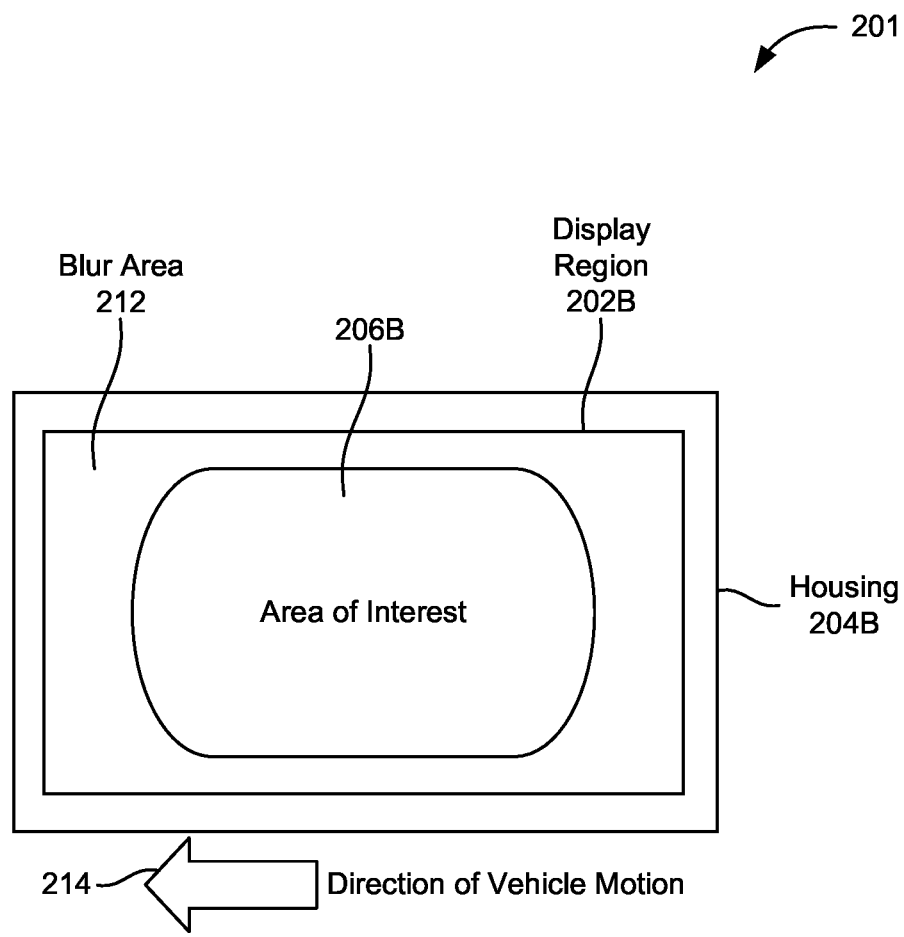
FIG. 2B illustrates an example display that can be configured reduce occupant motion sickness, according to aspects of the disclosed technology.

FIG. 2B illustrates an example display 201 that can be configured reduce occupant motion sickness, according to some aspects of the disclosed technology. Similar to display 220, display 201 can represent a display that is affixed to an interior surface of a vehicle cabin, such as an in-dash, or in-seat computer display that is provided in the cabin of an autonomous vehicle (AV).

Display 201 includes a display region 202B that is enclosed by housing 204B. Display region 202B can be configured to display images/graphics, for example, as part of an infotainment system, navigation system, or AV monitoring system, or the like. Housing 204B can be coupled to one or more AV structures (not illustrated) such as a vehicle seat, headrest, and/or dashboard, etc. In practice, an occupant's gaze at display region 202B can be measured/detected (e.g., using one or more cabin cameras) to determine an area of interest 206B. To mitigate the likelihood that vehicle motion (e.g., motion events) will trigger motion sickness in the occupant/user, one or more portions of display region 202B can be blurred (blur area 212) based on a direction of vehicle motion, as indicated by motion vector 214. That is, in the example of FIG. 2B, motion compensation signals generated in response to the vehicle motion (motion events) can be used to modify the display of graphics/images provided in display region 202B, in order to reduce or eliminate the experience of motion sickness.

Figure 2C:
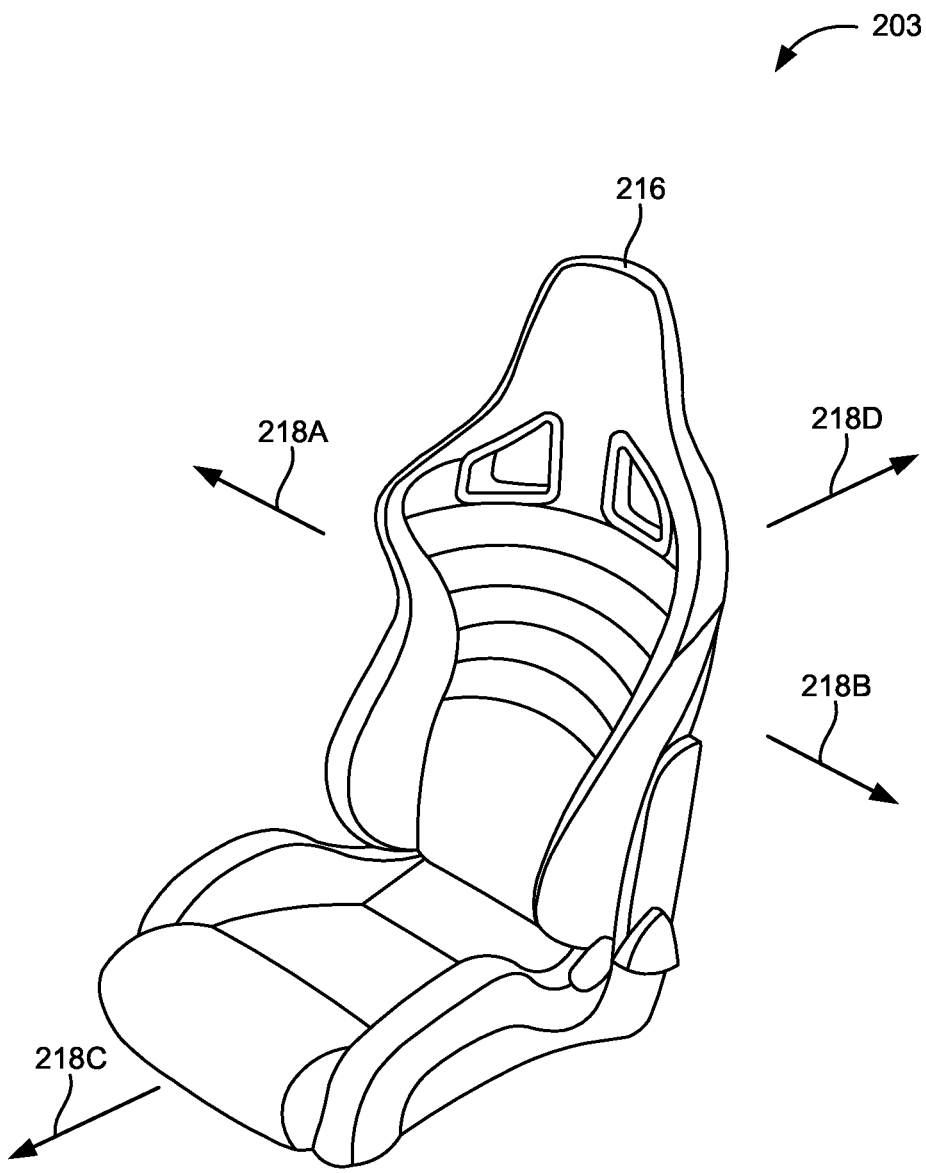
FIG. 2C illustrates an example car seat that can be configured to provide haptic outputs to attenuate occupant experienced motion sickness events, according to some aspects of the disclosed technology.

FIG. 2C illustrates an example car seat 203 that can be configured to provide haptic outputs to attenuate motion sickness events, according to some aspects of the disclosed technology. Car seat 203 can be situated in a vehicle cabin, for example, of an AV (not illustrated). In practice, car seat 203 can include cabling and motors necessary to receive a motion compensation signal, and to provide a haptic response that is calibrated to prevent or reduce motion sickness of an occupant of the seat 203. One or more motors in car seat 203 can be configured to move the car seat 203 along one or more directions, as indicated by direction vectors 218. By way of example, car seat 203 may be configured to move forward (218C), backward (218D), and/or side-to-side (218A, 218B).

Depending on the desired implementation, the haptic response of seat 203 can be provided concurrently to the experience of a motion event by the seat occupant. Alternatively, the haptic response may be provided in advance of an experienced motion event to prepare or prime the occupant for the motion event. In some aspects, future motion events may be predicted based on motion data collected by one or more vehicle sensors, and in addition to route/path information that is known for the vehicle. By way of example, if a certain route/path is known to cause be subject to a motion event that is likely to cause sickness in the users/occupants, then the motion compensation signaling may be used preemptively to adjust cabin parameters (e.g., display position, display output, and/or seat haptics), in order to mitigate the effects of the motion event.

Figure 3:
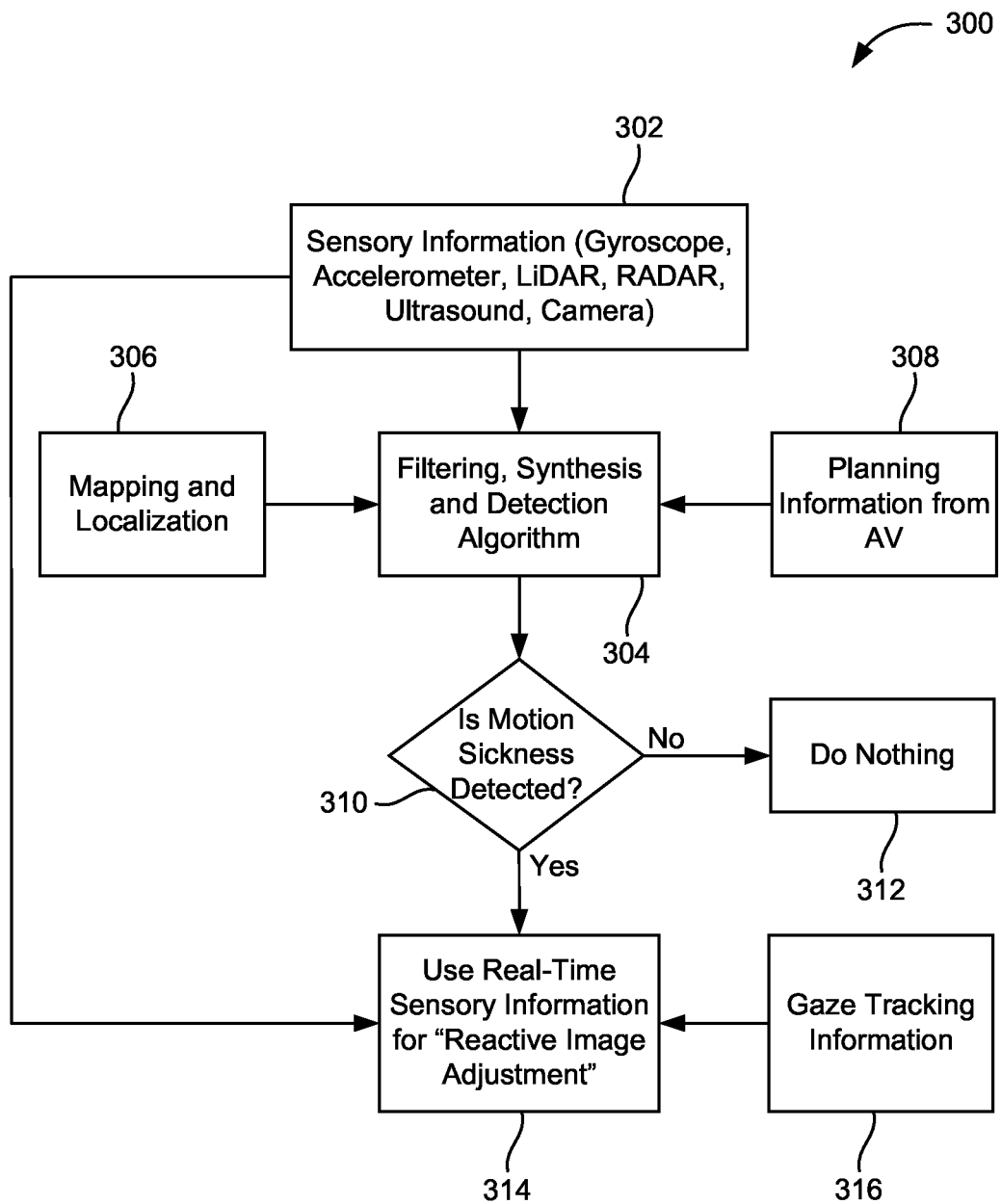
FIG. 3 illustrates steps of an example process for detecting and mitigating a motion sickness event, according to some aspects of the disclosed technology.

FIG. 3 illustrates steps of an example process 300 for detecting and mitigating a motion sickness event, according to some aspects of the disclosed technology. Process 300 begins with step 302 in which motion data (e.g., sensory information or environmental data) is collected one or more sensors. Motion data collection can be performed using essentially any type of vehicle sensor, which can include, but is not limited to: gyroscopes, accelerometers, Light Detection and Ranging (LiDAR) sensors, radars, ultrasounds and/or cameras, etc.

Next, at step 304, the collected motion data is processed/filtered to identify motion events that may induce motion sickness in one or more vehicle passengers. In some aspects, collected motion data is processed together with map localization data 306 and/or data pertaining to the vehicle planning/routing 308. By understanding route information as well as current vehicle localization, potential motion events can be more accurately identified. For example, if it is known that the AV is about to perform a maneuver that may induce motion sickness, localization information (306) and routing planning information (308) can be used to determine the potential timing and magnitude of the impending motion event. That is, map and planning information can be used to preemptively trigger motion sickness detection for locations and situations that are known to cause sickness based on prior experience, as discussed in further detail below.

In step 310, it is determined if a motion event is likely to lead to motion sickness of the passenger. In some implementations, this determination may be made based on the duration and/or force profile of the motion event. For example, motion events that fall below a predetermined threshold in terms of force and/or distance (displacement) may not be deemed to be motion sickness causing events, in which case, process 300 advances to block 312. In some aspects, determinations as to whether a motion event is likely to lead to motion sickness can be based on a direction of the occupant's gaze, such as, the direction of the occupants view onto a display screen in the vehicle cabin.

Alternatively, if it is determined that the motion event may result in the occupant's sickness, then process 300 proceeds to step 314, in which real-time sensory information (step 302) is used to perform a reactive image adjustment. The reactive image adjustment (e.g., motion compensation signal) can be based on a direction of the user's gaze (312). As discussed above (see FIG. 2A), the reactive image adjustment may include changes to the position of one or more mounted displays e.g., so that the display screen can be physically oriented in reaction to the vehicles motion. In other aspects, the reactive image adjustment may be performed in software, for example, by applying image adjustments/compensation to graphics that are displayed in the vehicle cabin (see FIG. 2B). Depending on the desired implementation, reactive image adjustments may be applied to one or more mobile devices, such as a mobile device associated with an AV user/occupant.

Figure 4A:
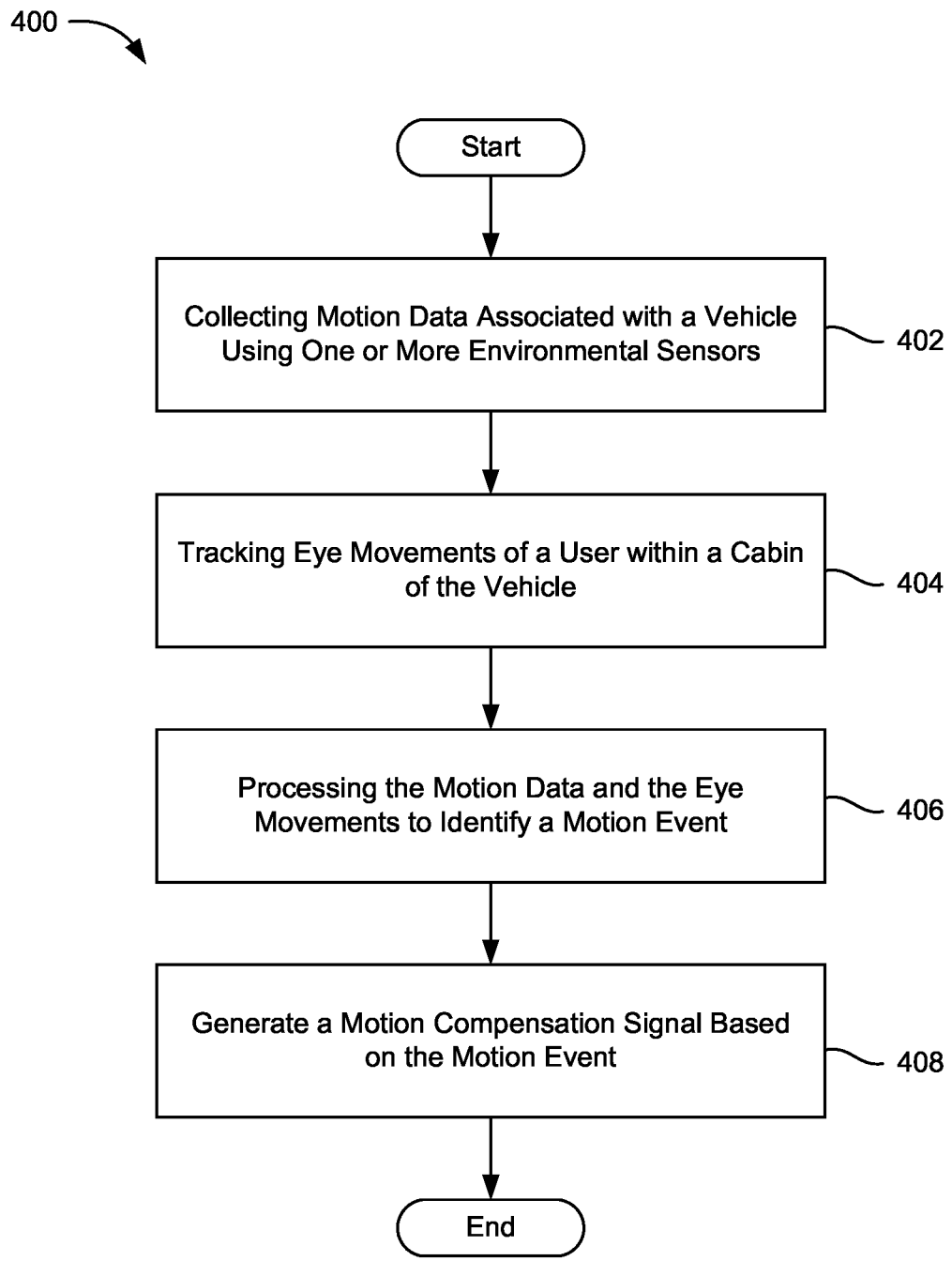
FIG. 4A illustrates steps of an example process for generating a motion compensation signal based on a motion event, according to some aspects of the disclosed technology.

FIG. 4A illustrates steps of an example process 400 for generating a motion compensation signal based on a motion event, according to some aspects of the disclosed technology. Process 400 begins with step 402 in which motion data associated with a vehicle (e.g., an AV) is collected using one or more environmental sensors. As discussed above, environmental sensors can include, but are not limited to one or more of a gyroscopes, accelerometers, Light Detection and Ranging (LiDAR) sensors, radars, ultrasounds and/or cameras, etc. In some implementations, the motion data may further include localization and/or routing/planning information for the AV.

In step 404, eye movements of one or more users in the vehicle cabin are tracked, e.g., to determine a direction of the users' gaze. Gaze tracking can be performed using one or more cameras, including cameras provided as part of the AV cabin and/or cameras on the user's smartphone, and/or another device.

In step 406, the motion data and eye movement data are processed to identify one or more motion events. As discussed above with respect to process 300, the identification of motion events likely to result in occupant sickness can be based on a predetermined threshold for motion parameters, such as displacement, g-forces, and/or motion direction, etc. If relevant motion events are detected, then process 400 proceeds to step 408 in which a motion compensation signal is generated.

The generated motion compensation signal can be configured to adjust one or more AV cabin parameters to counteract the motion event, for example, to attenuate or eliminate the occupant's motion sickness experience. The motion compensation signal can be implemented instantaneously/concurrently, for example, to reduce the perceived effect of the motion event by adjusting a display position, or by adjusting graphics, e.g., by performing dynamic edge-blurring or image stabilization, etc., as described above with respect to FIGS. 2A and 2B. In some aspects, the motion compensation signal can be used to provide a haptic output to the user/occupant, as described in further detail with respect to the process illustrated in FIG. 4B. Depending on the desired implementation, the motion compensation signal may be used to pre-adjust or prime the occupant for the motion event. That is, display position and/or display image adjustments may be implemented before occurrence of the motion event. However, in other embodiments, the motion compensation signal may be used to make any necessary adjustment in a manner that is temporarily concurrent with the motion event.

Figure 4B:
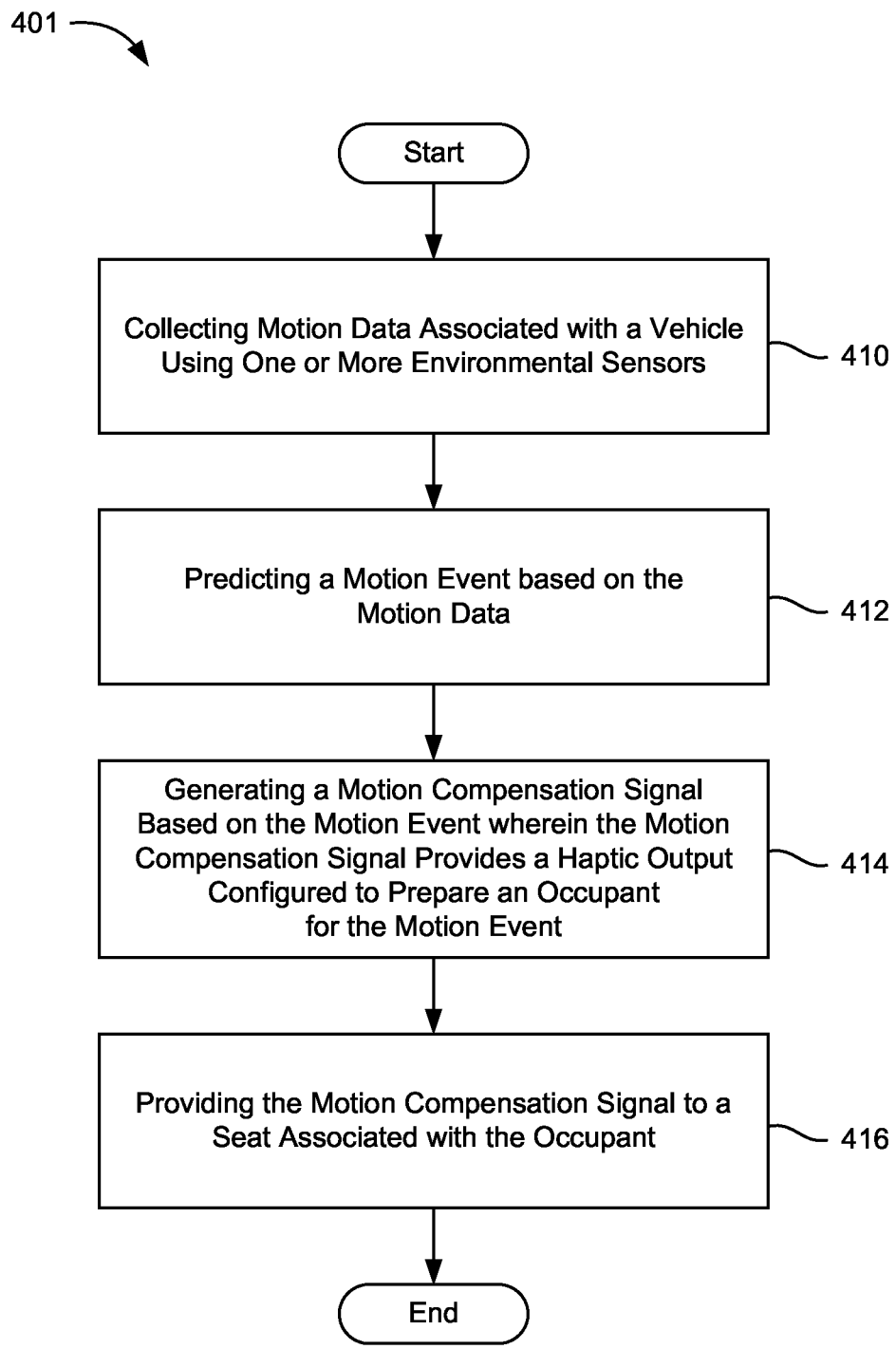
FIG. 4B illustrates steps of an example process for generating a motion compensation signal that is provided to an occupant's seat, according to some aspects of the disclosed technology.

In particular, FIG. 4B illustrates steps of an example process 401 for generating a motion compensation signal that is provided to an occupant's seat, according to some aspects of the disclosed technology. Process 401 begins with step 410 in which motion data associated with a vehicle (e.g., an AV) is collected using one or more environmental sensors. As discussed above, the environmental sensors can include, but are not limited to one or more of a gyroscope, accelerometer, Light Detection and Ranging (LiDAR) sensor, radar, ultrasound and/or camera, etc. In some implementations, the motion data may further include localization and/or routing/planning information for the AV.

In step 412, one or more upcoming motion events are predicted based on the collected motion data. In some aspects, the prediction of future motion events can also be informed by vehicle localization and/or route planning information.

In step 414, a motion compensation signal is generated based on the motion event, wherein the motion compensation signal provides a haptic output configured to prepare an occupant for the motion event. As discussed above with respect to FIG. 2C, the motion compensation signal may be used to actuate/move the occupant's seat to reduce the felt effect of the motion event and/or to prime the occupant for the experience, thereby reducing the likelihood that he/she will become motion sick (416).

Figure 5:
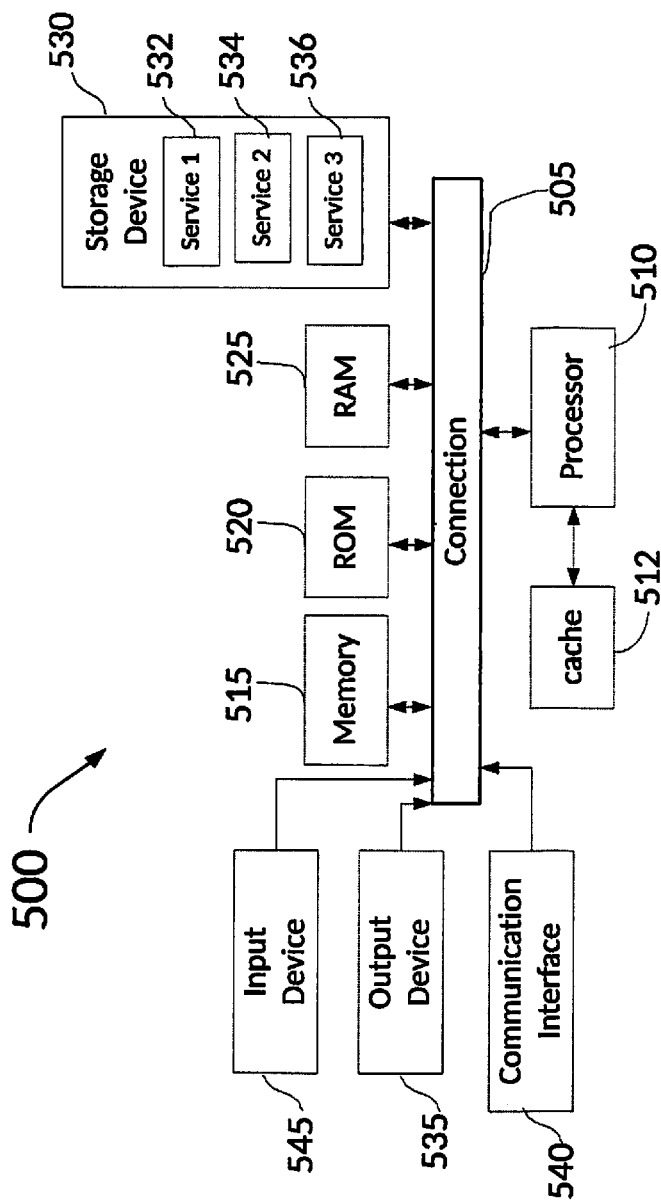
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 110, remote computing system 150, a passenger device executing the rideshare app 170, internal computing system 110, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system comprising:
a memory; and
one or more processors coupled to the memory, the one or more processors configured to:
obtain, from one or more sensors of a vehicle navigating a route, motion data associated with the vehicle navigating the route;
obtain map localization data of the vehicle and route planning data of the vehicle;
tracking eye movements of an occupant, within a cabin of the vehicle, along the route using the one or more sensors of the vehicle, wherein the tracking is associated with the collected motion data;
predict a motion event associated with the vehicle navigating the route based on the motion data and the map localization data of the vehicle and the route planning data of the vehicle, wherein the motion event relates to a vehicle maneuver predicted to occur along the route; and
generate a motion compensation signal based on the predicted motion event, wherein the motion compensation signal is configured to adjust at least one display associated with the vehicle, including a blur filter applied to the at least one display based on (1) an anticipated direction of the vehicle as indicated by the predicted motion event and (2) a gaze of the occupant of the vehicle based on the tracked eye movement of the occupant such that at least a peripheral region of the gaze of the occupant is blurred.

2. The system of claim 1, wherein predicting the motion event comprises determining a potential timing of the motion event based on the map localization data of the vehicle and the route planning data of the vehicle.

3. The system of claim 1, wherein predicting the motion event comprises determining a potential magnitude of the motion event based on the map localization data of the vehicle and the route planning data of the vehicle.

4. The system of claim 1, wherein the motion compensation signal is further configured to actuate or move a seat on the vehicle used by an occupant of the vehicle.

5. The system of claim 4, wherein the motion compensation signal is further configured to actuate or move the seat on the vehicle before the vehicle experiences the motion event.

6. The system of claim 4, wherein the motion compensation signal is further configured to actuate or move the seat on the vehicle during the motion event.

7. The system of claim 1, wherein the motion compensation signal is further configured to trigger a seat on the vehicle used by the occupant of the vehicle to generate a haptic output at least prior to the motion event or during the motion event.

8. The system of claim 1, wherein the one or more sensors comprises at least one of a gyroscope, an accelerometer, a camera sensor, and a Light Detection and Ranging (LiDAR) sensor.

9. A method comprising:
obtaining, from one or more sensors of a vehicle navigating a route, motion data associated with the vehicle navigating the route;
obtaining map localization data of the vehicle and route planning data of the vehicle;
tracking eye movements of an occupant, within a cabin of the vehicle, along the route using the one or more sensors of the vehicle, wherein the tracking is associated with the collected motion data;

predicting a motion event associated with the vehicle navigating the route based on the motion data and the map localization data of the vehicle and the route planning data of the vehicle, wherein the motion event relates to a vehicle maneuver predicted to occur along the route; and generating a motion compensation signal based on the predicted motion event, wherein the motion compensation signal is configured to adjust at least one display associated with the vehicle, including a blur filter applied to the at least one display based on (1) an anticipated direction of the vehicle as indicated by the predicted motion event and (2) a gaze of the occupant of the vehicle based on the tracked eye movement of the occupant such that at least a peripheral region of the gaze of the occupant is blurred.

10. The method of claim 9, wherein predicting the motion event comprises determining a potential timing of the motion event based on the map localization data of the vehicle and the route planning data of the vehicle.

11. The method of claim 9, wherein predicting the motion event comprises determining a potential magnitude of the motion event based on the map localization data of the vehicle and the route planning data of the vehicle.

12. The method of claim 9, wherein the motion compensation signal is further configured to actuate or move a seat on the vehicle used by an occupant of the vehicle.

13. The method of claim 12, wherein the motion compensation signal is further configured to actuate or move the seat on the vehicle before the vehicle experiences the motion event.

14. The method of claim 12, wherein the motion compensation signal is further configured to actuate or move the seat on the vehicle during the motion event.

15. The method of claim 9, wherein the motion compensation signal is further configured to trigger a seat on the vehicle used by an occupant of the vehicle to generate a haptic output at least prior to the motion event or during the motion event.

16. The method of claim 9, further comprising:

transmitting the motion compensation signal to a device associated with the occupant of the vehicle.

17. A non-transitory computer-readable storage medium comprising instructions stored thereon, which when executed by one or more processors, cause the one or more processors to:

obtain, from a first set of sensors of a vehicle navigating a route, motion data associated with the vehicle navigating the route;

obtain map localization data of the vehicle and route planning data of the vehicle;

tracking eye movements of an occupant, within a cabin of the vehicle, along the route using a second set of sensors of the vehicle, wherein the tracking is associated with the collected motion data;

predict a motion event associated with the vehicle navigating the route based on the motion data and the map localization data of the vehicle and the route planning data of the vehicle, wherein the motion event relates to a vehicle maneuver predicted to occur along the route; and generate a motion compensation signal based on the predicted motion event, wherein the motion compensation signal is configured to adjust at least one display associated with the vehicle, including a blur filter applied to the at least one display based on (1) an anticipated direction of the vehicle as indicated by the predicted motion event and (2) a gaze of the occupant of the vehicle based on the tracked eye movement of the occupant such that at least a peripheral region of the gaze of the occupant is blurred.

18. The non-transitory computer-readable storage medium of claim 17, wherein predicting the motion event comprises determining a potential timing of the motion event based on the map localization data of the vehicle and the route planning data of the vehicle.

19. The non-transitory computer-readable storage medium of claim 17, wherein predicting the motion event comprises determining a potential magnitude of the motion event based on the map localization data of the vehicle and the route planning data of the vehicle.

20. The non-transitory computer-readable storage medium of claim 17, wherein the motion compensation signal is further configured to actuate or move a seat on the vehicle used by an occupant of the vehicle.

* * * * *